Figure 1:
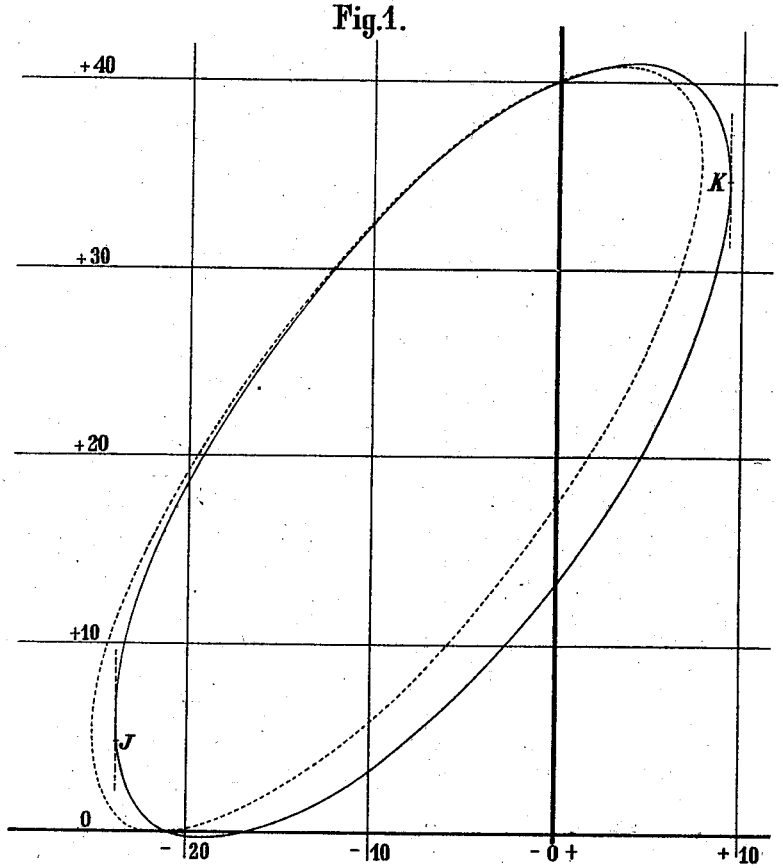

A. GLEICHEN.
EYEGLASSES.
APPLICATION FILED APR. 5, 1921.

1,438,821.

Patented Dec. 12, 1922.

Inventor:
Alexander Gleichen
by
Leo J. Matty
atty

Patented Dec. 12, 1922.

1,438,821

UNITED STATES PATENT OFFICE.

ALEXANDER GLEICHEN, OF BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

EYEGLASSES.

Application filed April 5, 1921. Serial No. 458,870.

*To all whom it may concern:*

Be it known that I, Dr. ALEXANDER GLEICHEN, citizen of the German Republic, residing at Berlin, Germany, have invented certain new and useful Improvements in Eyeglasses (for which applications have been filed for Letters Patent in the following countries: Germany, filed January 15, 1919; France, filed June 10, 1920; Great Britain, filed June 18, 1920; Italy, filed June 23, 1920; Japan, filed August 28, 1920), of which the following is a specification.

My invention relates to improvements in eye-glasses and has for its object to produce an eye-glass which exposes the eye of the user to the least possible strain thus avoiding pain and tire of the eyes.

If a beam of light coming from a point in an external object, said beam having a mean obliquity of axis of, e. g., 30°, passes a spectacle lens and enters the pupil of an eye, the axis of the beam of rays refracted by the lens must be directed towards the centre of motion of the eye in order that the latter may see the object point clearly when turned towards it. The mean distance of the centre of motion from the spectacle lens or—to be more exact—from the second principal point is 25 mm. This distance is called the stop distance $l$. The clinical application of spectacle lens is made in two ways: In correcting the eyes for distant objects the posterior focus of the spectacle lens is made to coincide with the far point of the myopic eye. In this case the correcting lens is about 12 mm. in front of the vertex of the cornea. If the absolute value of the focal length of a spectacle lens is called $f$, the radius of the sphere of the far point is $f-l$, if the eye is hypermetropic, or $f+l$ if the eye is myopic. Of late the distance of the far point is measured from the vertex of the lens on the side towards the image, and the inverse value of this distance (in meters) is termed "vertex refraction." With thin lenses like those of spectacles "vertex refraction" and refractive power are identical.

In another way spectacle lenses are used to correct presbyopia. In this case the object is situated at the reading distance $m$ from the spectacle lens or from its first principal point. By the action of a collecting lens (leaving aside for the present the possibility of using dispersing lenses) the object is brought on to the sphere of distinct vision caused for the eye in question by the convergency of the rays and a consequent accommodation. The radius of this sphere of distinct vision is expressed by the formula $l+\dfrac{f \cdot m}{f-m}$. The conventional "reading distance" $m$ or near point distance is 250 mm. (roughly 10 inches). Of course the centre of the sphere of distinct vision as well as the centre of the sphere of the far point coincides with the centre of motion of the eye.

As is known a beam of rays refracted by a spectacle lens having a considerable obliquity of axis will generally show astigmatism, i. e., the rays which are close to the axis of the beam intersect the latter in two points only. Moreover they form two image lines, which are at right angles to each other. Except at the image lines the cross sections of the beams generally show an elliptical form. On two points only the cross sections are circular, e. g., in the first place, where the circular stop, i. e., the pupil of the eye, or better the entrance pupil of the eye bounds the rays and in the second place at a point between the astigmatic points. The latter cross-section is termed "the circle of least confusion."

If such an astimatic beam of rays enters the optical system of the eye, which latter by its rolling motion has brought its own axis in the direction of the axis of the beam refracted by the lens (lens for distant objects) there will appear in the fovea not a point image of the object point, but generally an elliptical figure of aberration; for on the retina there will appear an image, the object of which is to be considered as the cross section of the beam with the sphere of the far point.

There have been endeavours to prevent or at least to lessen the said defects which occur when the entering beam of light has a considerable obliquity of axis, by changing from the so-called bi-lens to the meniscus form. In this way the astigmatic points of obliquely entering beams come closer together and the astigmatism is lessened. It is even possible for any prescribed refractive power of a spectacle lens to unite the astigmatic points for a certain mean obliquity of e. g. 30° in a single point by selecting the adequate radii, so that the beam in question—at least considering the astigmatism—is equal to the paraxial beams, i. e., homocentric. The correct calculations of lenses of this kind were first given by Tscherning (see Archiv für Optik, vol. 1, p. 401).

With these lenses the two astigmatic image spheres are practically united in a single sphere. However, this sphere generally does not coincide with the sphere of the far point, but the beams penetrate the latter with circles of aberration, so that there is a certain blurring of the image on the retina of the eye when viewing without accommodation. There have been suggestions to prevent this fault by prescribing an adequate lens, so that with a certain amount of accommodation the centre and the rim of the field of view may be seen clearly. But this suggestion amounts to making the refractive power of the lens in the optical axis different from that required. Consequently in using such a lens, the eye is compelled to accommodate continuously. This may be injurious to the health. According to modern medical opinion the constant strain of accommodating will favour the formation of cataract.

The new invention is to afford to the eye an easy, pleasant and clear vision by selecting the radii of curvature of the lens at a certain refractive power so that for a mean obliquity of the rays the circle of least confusion is situated on the sphere of the far point of the eye. "Circle of least confusion" means here, as generally in optical literature, that cross-section of the beam of light, in which the diameters of the cross-sections in the radial and tangential planes are the same. That is to say, it is not intended completely to do away with astigmatism of oblique beams, as with "Tscherning lenses." The above demand leads to a new type of spectacle lenses which is geometrically as clearly defined as "Tscherning" lenses. The advantages against the latter glasses are shown by the following explication:

The circle of least confusion is a symmetrical point of the beam, in which the tangential component is equal to the radial component and which forms to a certain degree an optimum compared to the two adjoining cross-sections, so there is no instigation to strain the eye by accommodation. The image is evenly defined over the whole field of view and there is no deficiency in the acuity of vision in certain directions, as is otherwise produced by astigmatic beams of light. Especially important is the fact, that generally the acuity of vision is considerably greater than with "Tscherning's lenses."

This acuity of vision is in inverse ratio to the diameter of the circles of aberration, which by the beam of rays are cut out of the sphere of the far point and may be measured by the inverse value of the angle of the circle of aberration in question.

According to the present invention with a spectacle lens of e. g.—10 dioptres, which is corrected for a supposed refraction index of 1.530 and a distance of 25 mm. from the centre of motion of the eye to the posterior vertex of the lens, supposing an obliquity of the beam towards the eye of 30° and a diameter of pupil of 4 mm. (see Example No. 1), the angular diameter of the circle of least confusion is about 100″, while the corresponding circle of aberration of a Tscherning-lens has a diameter of about 190″.

In an analogous way there results for lenses having an equivalent refractive index of +7.2 dioptres refractive power with the new lens (see Example No. 2) an angular diameter of the circle of least confusion of about 200″, while on the other hand with a Tscherning lens this value amounts to 400″.

Consequently the acuity of vision (power of definition) with the new lenses is about twice that of the corresponding Tscherning lens.

For the new lenses there results for any prescribed refractive power two different forms, the first of which shows a less curvature, while the other form has a greater curvature, and which, as with "Tscherning" lenses may be termed Ostwalt's and Wollaston's forms.

Figure 2:
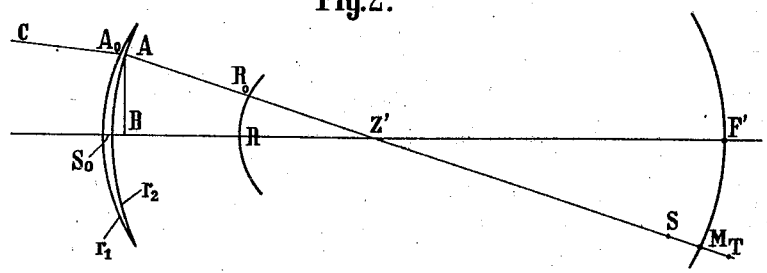

Fig. 1 is a diagram of curvatures of so-called Tscherning lenses (dotted line) in comparison to the curvatures of lenses in accordance with this invention (full line). Fig. 2 is a diagram of the constructional principle of the lenses of this invention.

The diagram according to Figure 1 shows for a refractive index $n=1.530$ on the horizontal axis (abscissal axis) the different values for the refractive power D of the lens in dioptres and as ordinates the corresponding values of the front curvatures $c_1$,—also in dioptres—both for "Tscherning" lenses and for lenses according to this invention. In this way there results two closed curves, of which the one showing the "Tscherning" lenses is shown in dotted, the other showing the lenses according to this invention in solid lines. If we draw tangents to these curves parallel to the ordinary axis, in both cases the upper or Wollaston's branch is separated from the lower or Ostwalt's branch by the points of contact. These points of contact are marked in Figure 1 by the reference letters J and K.

*Examples.*

1. Refractive power — 10 dioptres $r_1 = +400.0$ mm.
$r_2 = +46.6$ mm.  $d=1.0$ mm.  $n=1.530$ 2. Refractive power + 7.2 dioptres $r_1 = +47.1$ mm.
$r_2 = +119.1$ mm.  $d = 4.5$ mm.  $n = 1.530$ Both of the above lenses are corrected for an obliquity of axis (after the beam has passed the lens) of 30° and a distance of 25 mm. from the centre of motion of the eye to the rear vertex of the lens.

Quite similar considerations as for lenses for viewing distant objects may be made for reading-glasses.

If the refractive power or to be more exact the "vertex refraction" of the reading-glass and the stop distance are determined (if necessary with regard to the central thickness of the lens), the place and curvature of the sphere of distinct vision are always unquestionably determined. Its centre coincides with the centre of motion of the eye and its vertex is determined by producing, by means of the reading-glass, the image of an object-point, located within reading-distance of the eye on the axis of the reading-glass, assuming the lens to be in a correct position in front of the eye.

Reading-glasses according to the present invention may be made in two forms, i. e., Wollaston's and Ostwalt's form. The latter, just the same as with lenses for distant objects, is generally preferable on account of its having a slighter curvature.

To give a closer explanation, Figure 2 shows a positive meniscus lens, the thickness of which we assume to be infinitesimally small considering the radii $r_1$ and $r_2$ of its curvatures. Let us assume moreover $n$ to be the refractive index and D the refractive power of the lens, which in the present case is identical with the "vertex refraction," $S_0$ to be the vertex and $F^1$ the rear focus of the lens we draw a principal ray through the centre of motion of the eye $Z^1$ on which are the two astigmatic image points T and S for the radial and tangential part of the rays supposing the object point to be infinitesimally distant. At the point A a perpendicular A B = $h$ is erected on the axis. The value $h$ is assumed so small that its fourth and higher powers may be neglected. The point $F^1$ may coincide with the far point of the—in the present case—hypermetropic eye. Now, while the eye rolls to view in the direction $A_0C$ the centre of the pupil of the eye (or to be more exact of the entrance pupil of the eye) has moved from the point R to the point $R_0$. $Z^1$ is the centre and $Z^1 F^1$ is the radius of the sphere of the far point. The latter intersects the obliquely entering beam at the point M between S and T.

If we assume in Figure 2

$S_0 F' = f$;  $SZ' = 1$;  $RZ' = R_0 Z' = d$;

$$AZ' = c;\ AS = s;\ AT = t;$$

$$\frac{1}{r_1} = \zeta_1;\ \frac{1}{r_2} = \zeta_2;\ \frac{1}{l} = \lambda$$

By serial development is found $$s = f - h^2 f^2 P \quad (1)$$
$$t = f - h^2 f^2 Q \quad (2)$$
$$c = l + h^2 f^2 U \quad (3)$$

Here P, Q and U have the following values:

$$P = \frac{D}{2n}\left[\zeta_1^2(4n+5) + \zeta_1\frac{D(n^2-4n-6)-6\lambda(n^2-1)}{n-1} + (2n+1)\left(\frac{D}{n-1}+\lambda\right)^2\right] \quad (4)$$

$$Q = \frac{D}{2n}\left[\zeta_1^2(2n+1) + \zeta_1\left(\frac{D(n^2-2n-2)}{n-1}-2\lambda(n+1)\right) + \left(\frac{D}{n-1}+\lambda\right)^2\right] \quad (5)$$

$$U = \frac{D^2}{2}\left(\lambda + \frac{D}{n-1} - \zeta_1\right) \quad (6)$$

moreover as is known there is $$\zeta_1 - \zeta_2 = \frac{D}{n-1} \quad (6^a)$$

For a "Tscherning" lens (stigmatic) there must be $s = t$. According to equations 1 and 2 there follows $$P = Q. \quad (7)$$

Substituting in equation (7) the values for P and Q from equations 4 and 5 there results a quadratic equation for the curvature $\zeta_1$ of the front surface. This equation contains—excepting $\zeta_2$—nothing but the refractive power D, the refractive index $n$ and the inverse stop distance $\lambda = \frac{1}{l}$. The conventional value for $l$ is 25 mm. From equation (7) there follows for any D two different values of $\zeta_1$ and consequently two different forms of lenses, which are termed, as mentioned above, Ostwalt's and Wollaston's forms. Equation ($6^a$) serves to calculate the curvature $\zeta_2$ of the rear surface of the lens.

To calculate the lenses according to the present invention it is necessary for the point M in Figure 2 to coincide with the centre of the circle of least confusion. To this purpose the intersection spaces of the astigmatic image points T and S are to be put into relation to the centre $R_0$ of the pupil as a fixed point. To this purpose we assume:

$$R_0 S = s_0;\ R_0 T = t_0;\ R_0 M = RF' = p_0$$

Now, as may be easily proved the points S, T, $R_0 M$ are four harmonical points. In this case there is $$\frac{1}{s_0} + \frac{1}{t_0} = \frac{2}{p_0} \quad (8)$$

From Figure 2 may be directly read:

$$s_0 = s - c + d \quad (9)$$
$$t_0 = t - c + d \quad (10)$$
$$p_0 = f + d - 1 \quad (11)$$

By aid of the equations 1, 2, 3 and 11 the equations 9 and 10 may be written:

$$S_0 = p_0 - h^2 f^2 (P+U)$$
$$t_0 = p_0 - h^2 f^2 (Q+U)$$

Whereupon the equation 8 takes the form:

$$\frac{2}{p_0} = \frac{1}{p_0 - h^2 f^2 (P+U)} + \frac{1}{p_0 - h^2 f^2 (Q+U)}$$

$$P + Q + 2U = \frac{2h^2 f^2}{p_0}(P+U)(Q+U)$$

Since $h^2$ is very small, this equation may be written $$P + Q + 2U = 0 \quad (12)$$

which gives a condition for the circle of least confusion being on the sphere of the far point.

By inserting the values for P, Q and U from the equations (4), (5) and (6) in equation (12), the latter as well as equation (7) is a quadratic equation for $\zeta_1$ if the values for $n$, D and $\lambda$ are fixed. The curvature $\zeta_2$ of the rear surface then follows directly from equation (6$^a$). So the new lenses according to the present invention are as strictly defined as the "Tscherning" lenses; their nature however is defined by another relation of the data of construction of the lenses, which up to date has been unknown. As from equation (12) there results two values of $\zeta_1$ for any value of D, so also with the new lenses—as mentioned above—follow for any D two different forms of lenses, one being less curved and the other having a greater curvature.

To calculate on which conditions a "Tscherning" lens having a fixed stop distance $l = \frac{1}{\lambda}$ and a fixed refractive index $n$ is identical to a lens according to the present invention, it is necessary to accept both equations (7) and (12) simultaneously. This leads to the postulation $$P = -U \text{ and } Q = -U \quad (12^a)$$

By inserting in both equations (12) and (12$^a$) the values for P, Q and U from equations 4, 5 and 6, we get two equations of $\zeta_1$ and D from which these two values may be determined. By a closer examination of the equation (12) we find the two following congruous pairs of values.

(1) D = 0 and $\zeta_1 = \lambda$
(2) D = $-(n-1)\lambda$ and $\zeta_1 = 0$

These two pairs of values correspond to the co-ordinates of those points in Figure 2 in which the two curves of the "Tscherning" lenses and of the new lenses intersect. With $n = 1.530$, and $l = 0.025$ m. those pairs of values will be (1) D = 0 and $\zeta_1 = 40$ dioptres
(2) D = $-21.3$ dioptres and $\zeta_1 = 0$ Both these lenses are practically out of the question, for the first lens has no refractive power at all and its front surface has a radius of curvature of $\frac{1}{40}$ m. = 25 mm. which is so small that oculists will not use it. On the other hand the second lens for myopic eyes of $-21.3$ dioptres will hardly ever be prescribed, because in such severe cases of myopia magnifying spectacles will be preferable.

What I claim is:—

1. Spectacle lens limited on both sides by spherical surfaces having such curvatures that the beams of mean obliquity which intersect each other after refraction by the lens behind same at a distance of about 25 mm. have their circles of least confusion lying at a distance of said point of intersection of light beams which is equal to the distance of the focal point of the lens from said point of intersection.

2. Spectacle lens limited on both sides by spherical surfaces having a focal length between $-1/11$ and $-1/16$ m. having such curvatures that the beams of mean obliquity which intersect each other after refraction by the lens behind same at a distance of about 25 mm. have their circles of least confusion lying at a distance of said point of intersection of light beams which is equal to the distance of the focal point of the lens from said point of intersection.

In testimony whereof I have signed this specification in the presence of two subscribing witnesses.

Dr. ALEXANDER GLEICHEN.

Witnesses:
MAX FERBREN,
JAK ZERMATH.